3,455,544
FLUIDISED BED HEATING SYSTEMS
Raymond Bernard Sims, Beaconsfield, England, assignor to Coal Industry (Patents) Limited, London, England, a company of Great Britain
Filed May 22, 1967, Ser. No. 639,970
Claims priority, application Great Britain, May 27, 1966, 23,966/66
Int. Cl. F27b 15/08, 9/14
U.S. Cl. 263—21                            11 Claims

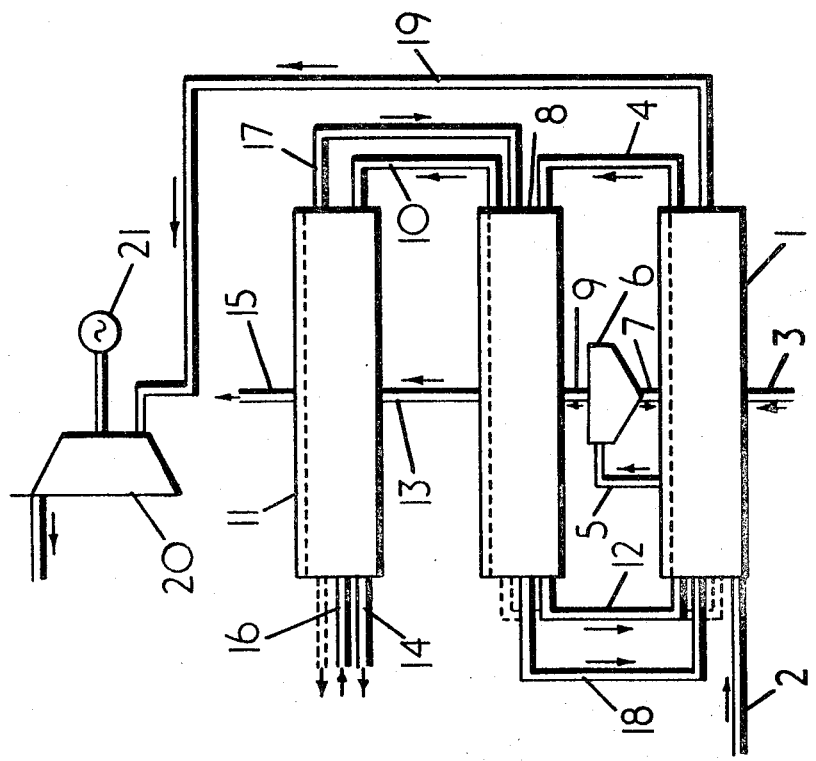

ABSTRACT OF THE DISCLOSURE

A fluidised bed heating system and method has serially-arranged fluidised beds, each of which has a heat exchanger in the bed for heating fluid; combustion of fuel in the bed providing the heat, and particulate material in the beds being exchanged to obtain efficient utilisation of the fuel.

---

This invention is for improvements in or relating to systems for heating fluids in a fluidised bed.

Several proposals have been made for utilising fluidised bed combustion techniques for heating fluids. Most of these proposals have utilised heating systems of the kind used in conventional solid fuel fired boilers, including, for example, water jackets. Fluidised bed heaters have the advantage of high heat transfer ratio through the bed, the abiilty to burn fuels with a high ash content and fuel particles of a larger size than pulverised fuel burners.

The advantages of improved heat transfer of fluidised bed heaters may be made use of by locating a heat-exchange arrangement for the fluid to be heated within the bed itself. With this arrangement a higher heat transfer rate between the fuel in the bed and the fluid, and a higher temperature of the fluid in relation to the temperature of the bed can be obtained than with conventional fluid heating arrangements. It has been found to be convenient to use such an arrangement in heating fluid for use in an expansion engine.

It is an object of the invention to utilise the material constituting the fluidised beds more fully, especially the fuel which may be extracted from the bed during operation.

Accordingly in one aspect the invention provides a method of heating fluid by means of a fluidised bed heating system wherein the fluid is caused to undergo heat-exchange with a first fluidised bed of particulate material in which a fuel is burnt and the fluid is also caused to undergo heat-exchange with a second heated fluidised bed; at least some of the material including fuel from the first fluidised bed being passed into the second fluidised bed and particulate material from the second fluidised bed being passed to the first fluidised bed.

Exchange of material between the two beds has been found desirable in order maintain optimum densities of the beds.

With the method of the invention the total mean residence time of fuel in the two fluidised beds taken together is increased as compared to a system having a single fluidised bed or a system having two or more fluidised beds in which no material is passed from one bed to another, and the amount of unburnt fuel passing out of the system is reduced.

According to a second aspect the invention provides a fluidised bed heating system comprising a first and a second fluidised bed container, a heat exchange arrangement in each fluidised bed container for leading fluid to be heated through each fluidised bed container, an inlet for introducing fuel into the first container, a conduit communicating between the first container and the second container for leading burnt and unburnt fuel constituting the fluidised bed in the first container from the first container into the second container, and a further conduit for leading material constituting the fluidised bed in the second container from the second container into the first container.

Further features of the invention appear from the following description given by way of example and with reference to the accompanying drawing which shows schematically one embodiment of the invention.

In the drawing three fluidised bed containers are shown and initially a first fluidised bed container 1 contains inert material, for example, ash and into the lower part of the container 1 particulate solid fuel, e.g. coal, is introduced along a conduit 2. The bed of particulate material is fluidised by fluidising and combustion-supporting gas introduced through a conduit 3 and in the bed some of the fuel is burnt and carbonisation of the fuel takes place.

The partially burnt and carbonised material forming the fluidised bed 1 is discharged from the upper part of the container 1 along a conduit 4 into a lower part of a second fluidised bed container 8 which also initially contains inert particulate material, for example, ash. The gas, containing relatively finer particulate material, passes out of the container 1 through a conduit 5 to a cyclone separator 6 for separating out the fines which are returned to the first container 1 along a conduit 7. The gas from the separator 6 passes to the second fluidised bed container 8 along a conduit 9 and this gas provides fluidising and combustion gas for the second fluidised bed in the container 8.

In the second fluidised bed container 8 further combustion of the fuel from the container 1 takes place until the fuel is completely burnt and particulate material from the upper part of the bed is passed along a conduit 10 to a third fluidised bed container 11, particulate material from the lower part of the second fluidised bed container 8 being returned along a conduit 12 to the upper part of the first fluidised bed container 1.

The volatile gases from the first fluidised bed container 1 are almost completely burnt in the second fluidised bed container 8 and the remaining combustion air from the second fluidised bed container 8 is passed with the exhaust gases along a conduit 13 into the third fluidised bed container 11. Any fuel contained in the material passed into the third fluidised bed container 11 is burnt in the bed and the bed is fluidised by the gases passed along the conduit 13. The container 11 constitutes the gases passed along the conduit 13. The container 11 constitutes an economiser and comprises hot substantially inert material or ash which is passed out of the container 11 through a conduit 14 communicating with the lower part of the container 11. Exhaust gases from the bed 11 are passed out of the container 11 through a conduit 15 to an exhaust flue (not shown).

Fluid to be heated by three fluidised beds is passed through the beds in series, the fluid being passed through the beds in heat-exchange relationship to be heated to successively higher temperatures as it passes from the coolest bed, i.e. the third fluidised bed in container 11, to the hottest bed, i.e. the first fluidised bed in container 1.

The fluid, which is preferably water, is first passed along a conduit 16 into heat exchange tubes (not shown) arranged within the material forming the third fluidised bed. The heated fluid is passed from the third container 11 along a conduit 17 to heat exchange tubes (not shown) arranged within the material forming second fluidised bed and from the second container 8 along a conduit 18 to heat exchange tubes (not shown) arranged within the material forming the first fluidised bed. The hot gaseous fluid is then passed along a conduit 19 from the first container 1 to an expansion engine 20, which is in this case a steam turbine, and the turbine 20 drives an electricity generator 21. The fluid from the turbine 20 may be passed to a compressor (not shown) before being returned along the conduit 16 to the third fluidised bed container 11.

The particulate material may be passed along the conduits from one fluidised bed container to another by means of air jets which entrain the material and convey it along the conduits.

The volatile products passing from the first fluidised bed container 1 may, as an alternative to being burnt in the second container 8, be burnt in a combustion chamber after discharge from the first container 1 and before entering into the second container 8.

Seperate fluidising gas may be used to fluidise the particulate material in the second and third fluidised beds which gas may be additional to the gas passed from the preceding bed.

Material may be passed from a lower part of the third bed 11 to a lower part of the first bed 1 and further recirculation of material may be made from the third to the second bed.

A further cyclone separator may be provided for removing fine material from the gases passing from the sectond to the third containers along the conduit 13, and the material may be discharged from the separator to either the second or the first fluidised bed.

Each of the fluidised bed containers may be formed conventionally, the fluidised bed being maintained in the containers in known manner by fluidising gas which fluidises particulate solid material constituting the beds.

I claim:
1. A method of heating fluid by means of a fluidised bed heating system wherein the fluid is caused to undergo heat-exchange with a first fluidised bed of particulate material in which fuel is burnt and the fluid is also caused to undergo heat-exchange with a second heated fluidised bed comprising; passing at least some of the material including unburnt fuel from the first fluidised bed into the second fluidised bed and passing particulate material from the second fluidised bed to the first fluidised bed.

2. A method according to claim 1 wherein the fluid to be heated is first caused to undergo heat exchange with the second fluidized bed and is subsequently caused to undergo heat exchange with the first fluidised bed.

3. A method according to claim 1 wherein hot gases leaving the first fluidised bed are led into the second fluidised bed.

4. A method according to claim 1 wherein material from the second fluidised bed is passed to a third fluidised bed and gases leaving the second fluidised bed are led to the third fluidised bed.

5. A method according to claim 4 wherein the fluid to be heated is subjected to heat exchange in the third fluidised bed before being passed to the second fluidised bed.

6. A method according to claim 1 wherein the fluid is in a gaseous state when it leaves the first fluidised bed and is used to drive a gas turbine.

7. A fluidised bed heating system comprising a first and a second fluidised bed container, a heat exchange arrangement in each fluidised bed container for leading fluid to be heated through each fluidised bed container, an inlet for introducing fuel into the first container, a conduit communicating between the first container and the second container for leading burnt and unburnt fuel constituting the fluidised bed in the first container from the first container into the second container, and a further conduit for leading material constituting the fluidised bed in the second container from the second container into the first container.

8. A system according to claim 7 comprising conduit means for leading fluid between the heat exchange arrangements in the two fluidised bed containers so that the fluid is subjected to heat exchange in the second fluidised bed container and is subsequently subjected to heat exchange in the first fluidised bed container.

9. A system according to claim 7 comprising a third fluidised bed container, a heat exchange arrangement in the third container for leading fluid to be heated through the third container, and conduit means communicating between the second container and the third container to lead particulate material from the second container to the third container.

10. A system according to claim 9 comprising conduit means for leading hot gases from the first container into the second container and then into the third container.

11. A system according to claim 7 comprising a gas turbine in communication with the heat-arrangement in the first fluidised bed container.

References Cited

UNITED STATES PATENTS

| 2,619,451 | 11/1952 | Ogorzaly et al. | |
| 2,718,754 | 9/1955 | Lewis et al. | 60—39.02 |
| 2,819,890 | 1/1958 | Rosa et al. | |

FREDERICK L. MATTESON, JR., Primary Examiner

EDWARD G. FAVORS, Assistant Examiner

U.S. Cl. X.R.

263—52